US008917777B2

(12) United States Patent
Xie et al.

(10) Patent No.: US 8,917,777 B2
(45) Date of Patent: Dec. 23, 2014

(54) METHOD, SYSTEM AND APPARATUS FOR EVALUATING VIDEO QUALITY

(75) Inventors: Qingpeng Xie, Shenzhen (CN); Fuzheng Yang, Shenzhen (CN); Shuai Wan, Shenzhen (CN); Sixin Lin, Shenzhen (CN); Lianhuan Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 489 days.

(21) Appl. No.: 12/976,319

(22) Filed: Dec. 22, 2010

(65) Prior Publication Data

US 2011/0085605 A1    Apr. 14, 2011

Related U.S. Application Data

(63) Continuation of application No. PCT/CN2009/071633, filed on May 5, 2009.

(30) Foreign Application Priority Data

Jul. 21, 2008    (CN) .......................... 2008 1 0130787

(51) Int. Cl.
| | | |
|---|---|---|
| H04N 7/64 | (2006.01) | |
| H04N 7/26 | (2006.01) | |
| H04N 17/00 | (2006.01) | |
| H04N 19/179 | (2014.01) | |
| H04N 19/166 | (2014.01) | |
| H04N 19/152 | (2014.01) | |
| H04N 19/44 | (2014.01) | |
| H04N 19/172 | (2014.01) | |

(52) U.S. Cl.
CPC ......... *H04N 17/004* (2013.01); *H04N 19/0029* (2013.01); *H04N 19/00242* (2013.01); *H04N 19/00193* (2013.01); *H04N 19/00533* (2013.01); *H04N 19/00266* (2013.01)
USPC ..................................................... 375/240.27

(58) Field of Classification Search
None
See application file for complete search history.

(56) References Cited

U.S. PATENT DOCUMENTS

| | | | |
|---|---|---|---|
| 2005/0111542 A1 | 5/2005 | Hattori | |
| 2005/0128943 A1* | 6/2005 | Gibbs et al. ................... | 370/229 |

(Continued)

FOREIGN PATENT DOCUMENTS

| | | |
|---|---|---|
| CN | 1809175 A | 7/2006 |
| CN | 101184222 A | 5/2008 |

(Continued)

OTHER PUBLICATIONS

Written Opinion of the International Searching Authority (translation) dated (mailed) Aug. 13, 2009, issued in related Application No. PCT/CN2009/071633, filed May 5, 2009, Huawei Technologies Co., Ltd. (4 pgs.).

(Continued)

*Primary Examiner* — Sath V Perungavoor
*Assistant Examiner* — Kate Luo
(74) *Attorney, Agent, or Firm* — Huawei Technologies Co., Ltd.

(57) ABSTRACT

A method, a system, and an apparatus for evaluating video quality are disclosed to improve accuracy of the evaluation. The method includes: obtaining information about a transmitted video; resolving the information about the transmitted video to obtain video frame parameters, where the video frame parameters include a compression distortion parameter and/or a video quality distortion parameter with packet loss; and calculating a video frame quality parameter according to the video frame parameters. An apparatus and a system for evaluating video quality are provided. The embodiments of the present invention improve accuracy of video quality evaluation without reference.

9 Claims, 4 Drawing Sheets

(56) References Cited

U.S. PATENT DOCUMENTS

| | | | | |
|---|---|---|---|---|
| 2006/0280242 | A1* | 12/2006 | Ugur | 375/240.03 |
| 2007/0019873 | A1* | 1/2007 | Tzannes et al. | 382/239 |
| 2008/0144519 | A1 | 6/2008 | Cooppan | |
| 2010/0053300 | A1* | 3/2010 | Einarsson et al. | 348/14.01 |

FOREIGN PATENT DOCUMENTS

| | | | |
|---|---|---|---|
| EP | 1727375 | A1 | 11/2006 |
| EP | 2106153 | A1 | 9/2009 |
| JP | 2000102041 | A | 4/2000 |
| JP | 2005159419 | A | 6/2005 |

OTHER PUBLICATIONS

Extended European search report, pursuant to Rule 62 EPC, supplementary European search report and the European search opinion as it relates to Application No. 09799953.6, mailed Jun. 22, 2011, Huawei Technologies Co., Ltd. (17 pgs.).

Miyaji et al., Development of Digital Compressed Picture Quality Assessment System Considering Human Visual Perception, Systems and Computers in Japan, vol. 31, No. 5, May 1, 2000, Scripta Technica 97-109, (XP-000976158) (13 pgs.).

Pastrana et al., Metrique Perceptuella des Rupture de Fluidite Video sans Reference, May 26, 2004 (XP-002354701) (4 pgs.).

Ries et al., Reference-Free Video Quality Metric for Mobile Streaming Applications, 8$^{th}$ Int'l Symposium on DSP and Communications Systems, DSPCS 2005 & 4$^{th}$ Workshop on the Internet, Telecommunications and Signal Processing, Institute of Communications and Radio-Frequency Engineering, Dec. 19, 2005, (XP-002609871) (5 pgs.).

Yang et al., Coding distortion assessment for streaming video, 2008 The Institute of Engineering and Technology 819-823, Aug. 1, 2008 (XP-002635210) (5 pgs.).

Tian et al., Motion Activity Based Wireless Video Quality Perceptual Metric, Signal and Information Processing lab, Beijing University, Proceedings of 2001 Int'l Symposium on Intelligent Multimedia, Video and Speech Processing, May 2-4, 2001, 527-530, (XP-010544778) (4 pgs.).

Reibman et al., Low-Complexity Quality Monitoring of MPEG-2 Video in a Network, AT&T Labs—Research, 2003 IEEE, vol. 3, Sep. 14, 2003, 261-264 (XP-010670340) (4 pgs.).

Riebman et al., Quality monitoring of video over the Internet, AT&T Labs—Research, 2002 IEEE vol. 2, Nov. 3, 2002, 1320-1324 (XP-010638413) (5 pgs.).

Winkler et al., The Evolution of Video Quality Measurement: From PSNR to Hybrid Metrics, IEEE Transaction on Broadcasting, vol. 54, No. 3, 660-668, Sep. 2008 (9 pgs.).

Timmerer et al., Measuring Quality of Experience for MPEG-21-based Cross-Layer Multimedia Content Adaptation, 2008 IEEE/ACS Int'l Conference on Computer Systems and Applications, Mar. 31, 2008, 969-974 (XP-031245071) (6 pgs.).

Vercheure et al., User-Oriented QoS Analysis in MPEG-2 Video Delivery, Real-Time Imaging, Academic Press Ltd., vol. 5, No. 5, Oct. 1, 1999, 305-314 , (XP-004419539), Article No. rtim.1999.0175, (10 pgs.).

Yang F. et al, "A novel objective no-reference metric for digital video quality assessment" IEEE Signal Processing Letters, vol. 12, No. 10, Oct. 2005.

Knee, M., "A single-ended picture quality measure for MPEG-2," Snell & Wilcox, UK.

Mohamed, S, "A study of real-time packet video quality using random neural networks," IEEE Transactions on Circuits and Systems for Video Technology, vol. 12, No. 12, Dec. 2002.

Lu, Z. et al, "Measuring the negative impact of frame dropping on perceptual visual quality," SPIE vol. 5666 (2005).

Kanumuri, S. et al, "Modeling Packet-Loss Visibility in MPEG-2 Video" IEEE Transactions on Multimedia, vol. 8, No. 2, Apr. 2006.

Turaga, D. et al., "No reference PSNR estimation for compressed pictures," Signal Processing: Image Communication 19 (2004) 173-184.

Watanabe, K. et al, "Objective video quality assessment method for freeze distortion based on freeze aggregation," SPIE-IS&T/vol. 6059 6059Y-1 (2006).

Versheure, O. et al, "User-oriented QoS analysis in MPEG-2 video delivery," *Real-Time imaging 5*, 305-314 (1999).

Wang, Z. et al, "Video quality assessment based on structural distortion measurement," Signal Processing: *Image Communication* 19 (2004) 121-132.

First Chinese Office Action dated (mailed) Aug. 11, 2010, issued in related Chinese Application No. 200910161628.9 Huawei Technologies Co., LTD.

International Search Report for International Application No. PCT/CN2009/071633, mailed Aug. 13, 2009 Huawei Technologies Co., LTD.

* cited by examiner

METHOD, SYSTEM AND APPARATUS FOR EVALUATING VIDEO QUALITY

CROSS-REFERENCE TO RELATED APPLICATIONS

This application is a continuation of International Application No. PCT/CN2009/071633, filed on May 5, 2009, which claims priority to Chinese Patent Application No. 200810130787.8, filed on Jul. 21, 2008, both of which are hereby incorporated by reference in their entireties.

FIELD OF THE INVENTION

The present invention relates to communication technologies, and in particular, to a method, a system, and an apparatus for evaluating video quality.

BACKGROUND OF THE INVENTION

With development of network technologies, Video On Demand (VOD), Internet Protocol Television (IPTV), and videophone have become mainstream services of the broadband network. Such services will also be mainstream services of the 3rd Generation (3G) wireless network.

VOD, IPTV and videophone transmit data like network video. The development of VOD, IPTV and videophone impels the development of network video.

With rapid development of network video, an urgent and important topic in the network video applications is how to evaluate the quality of network video conveniently and effectively. The quality of network videos needs to be monitored to ensure Quality of Service (QoS) of the network videos, and proper measures need to be taken to adjust and maintain the network videos and ensure normal operation of network videos. The quality of network videos depends on diverse factors, for example, QoS (such as bandwidth, packet loss, delay, and jitters) of the transmission channel, and adaptation between the video codec parameter and the transmission channel (such as coding mode, resolution, error-resistivity, and the propriety of the buffer control policy on the codec side). Besides, different locations of the lost video data caused by channel packet loss and delay also affect the subjectively perceived quality of videos in different ways; and the pause or jitter of the video caused by channel delay and jitters also affects the subjectively perceived quality of the video seriously.

In the prior art, a method for detecting the video quality is to calculate a Peak Signal to Noise Ratio (PSNR). The method includes:

obtaining an original reference video and a terminal video;

calculating a PSNR by comparing the original reference video with the terminal video; and determining quality of the video according to the calculated PSNR.

However, in the prior art:

(1) For a network video, due to limited bandwidth, the obtaining of the original reference video consumes plenty of bandwidth and transmission time, and brings waste of network resources.

(2) The PSNR value reflects only the Signal-to-Noise Ratio (SNR) between the terminal video signal and the original reference video signal. The SNR cannot reflect the users' feeling about the network video played. Therefore, the method of evaluating the video quality in the prior art leads to inaccurate results of detection.

SUMMARY OF THE INVENTION

The embodiments of the present invention provide a method, a system, and an apparatus for evaluating video quality to improve accuracy of the evaluation.

A method for evaluating video quality in an embodiment of the present invention includes:

obtaining information about a transmitted video;

resolving the information about the transmitted video to obtain video frame parameters, where the video frame parameters include a compression distortion parameter and/or a video quality distortion parameter with packet loss; and calculating a video frame quality parameter according to the video frame parameters.

Another method for evaluating video quality in an embodiment of the present invention includes:

obtaining information about a transmitted video, where the information includes at least duration of a video frame;

resolving the information about the transmitted video to obtain video frame parameters;

calculating a video frame quality parameter according to the video frame parameters; and performing a weighting operation for the video frame quality parameter and the duration to obtain a video sequence quality parameter.

An apparatus for evaluating video quality in an embodiment of the present invention includes:

a video frame obtaining unit, configured to obtain information about a transmitted video;

a video frame parameter calculating unit, configured to resolve the video information obtained by the video frame obtaining unit to obtain video frame parameters, where the video frame parameters include a compression distortion parameter and/or a video quality distortion parameter with packet loss; and a video frame quality parameter calculating unit, configured to calculate a video frame quality parameter according to the video frame parameters calculated out by the video frame parameter calculating unit.

A system for evaluating video quality in an embodiment of the present invention includes:

an apparatus for evaluating video quality, configured to: obtain information about a transmitted video; resolve the information about the transmitted video to obtain video frame parameters, where the video frame parameters include a compression distortion parameter and/or a video quality distortion parameter with packet loss; and calculate a video frame quality parameter according to the video frame parameters; and a sending apparatus, configured to obtain and send the video frame quality parameter generated by the apparatus for evaluating video quality.

The foregoing technical solution reveals that the embodiments of the present invention bring the following benefits:

In the embodiments of the present invention, after the information about the transmitted video is obtained, the compression distortion parameter and/or the video quality distortion parameter with packet loss are calculated out according to the video information. Afterward, the video frame quality parameter is calculated according to the compression distortion parameter and/or the video quality distortion parameter with packet loss. Therefore, the quality of the video frames can be calculated out according to only the information about the transmitted video on the terminal side, without the need of obtaining the original reference video; and the network resources are saved.

Secondly, the video frame quality parameter depends on the compression distortion parameter and/or the video quality distortion parameter with packet loss. Namely, the compression distortion parameter is an index for evaluating the video frame quality; and the video frame quality is in linear relation to the compression distortion parameter and/or the video quality distortion parameter with packet loss. Therefore, the compression distortion parameter and/or the video quality distortion parameter with packet loss can reflect the user's perception about the network video more intuitively, and improve the accuracy of evaluating the video quality.

BRIEF DESCRIPTION OF THE DRAWINGS

To make the technical solutions of the present invention clearer, the accompanying drawings for illustrating the embodiments of the present invention or the prior art are outlined below. Apparently, the accompanying drawings are for the exemplary purpose only, and persons of ordinary skill in the art can derive other drawings from such accompanying drawings without any creative effort.

DETAILED DESCRIPTION OF THE EMBODIMENTS

The technical solutions of the present invention are elaborated below with reference to accompanying drawings. Evidently, the embodiments described below are for the exemplary purpose only, without covering all embodiments of the present invention. Persons of ordinary skill in the art can derive other embodiments from the embodiments given herein without making any creative effort, and all such embodiments are covered in the protection scope of the present invention.

The embodiments of the present invention provide a method, a system, and an apparatus for evaluating video quality to improve accuracy of the evaluation.

The method for evaluating video quality in an embodiment of the present invention includes the following steps:

(1) Obtain Information about a Transmitted Video.

In this embodiment, the process of detecting the video quality is performed on the terminal. That is, the apparatus for evaluating video quality may be a part of the terminal or exist independently. The apparatus can evaluate the video quality by obtaining only the information about the video transmitted on the terminal side, without the need of obtaining the original reference video.

In this embodiment, the information about the transmitted video may include code rate, quantization factor of video codes, or duration of a video frame. It is understandable that in practical application, the information about the transmitted video may include other similar types of information.

(2) Resolve the Information about the Transmitted Video to Obtain Video Frame Parameters, where the Video Frame Parameters Include a Compression Distortion Parameter and/or a Video Quality Distortion Parameter with Packet Loss.

In this embodiment, the video information obtained in the foregoing step can be resolved to obtain video frame parameters, and the video frame parameters include a compression distortion parameter and/or a video quality distortion parameter with packet loss. The compression distortion parameter reflects the quality information when the video frame incurs only compression distortion but incurs no other type of loss; and the video quality distortion parameter with packet loss reflects the quality information when the video frame incurs only packet loss but incurs no coding compression loss.

In practice, the video frame parameters in this embodiment may further include other types of parameters, and are not limited herein.

(3) Calculate a Video Frame Quality Parameter According to the Video Frame Parameters.

The video frame parameters in this embodiment include a compression distortion parameter and/or a video quality distortion parameter with packet loss. Therefore, the process of calculating the video frame quality parameter is related to the specific video frame parameters. The calculated video frame quality parameter is a basis of evaluating the video quality.

In this embodiment, after the information about the transmitted video is obtained, the compression distortion parameter and/or the video quality distortion parameter with packet loss are calculated out according to the video information. Afterward, the video frame quality parameter is calculated according to at least the compression distortion parameter and/or the video quality distortion parameter with packet loss. Therefore, the quality of the video frames can be calculated out according to only the information about the transmitted video on the terminal side, without the need of obtaining the original reference video; and the network resources are saved.

Secondly, in this embodiment, the video frame quality parameter depends on the compression distortion parameter and/or the video quality distortion parameter with packet loss, namely, the compression distortion parameter and/or the video quality distortion parameter with packet loss are indices for evaluating the video frame quality; and the video frame quality is in linear relation to the compression distortion parameter and/or the video quality distortion parameter with packet loss. Therefore, the compression distortion parameter and/or the video quality distortion parameter with packet loss can reflect the user's perception about the network video more intuitively, and improve the accuracy of evaluating the video quality.

Depending on specific video frame parameters, the method for evaluating video quality in this embodiment comes in the following three scenarios.

Scenario 1: the Compression Distortion Parameter is Used as Video Frame Parameter.

In this embodiment, high quality of the transmission channel of the video may avoid the video quality distortion with packet loss, and the factor of the video packet loss does not need to be considered. However, in the prior art, network videos need to be coded and compressed due to limited bandwidth. In this embodiment, only the compression distortion parameter is used as a basis for evaluating the video quality.

Figure 1:
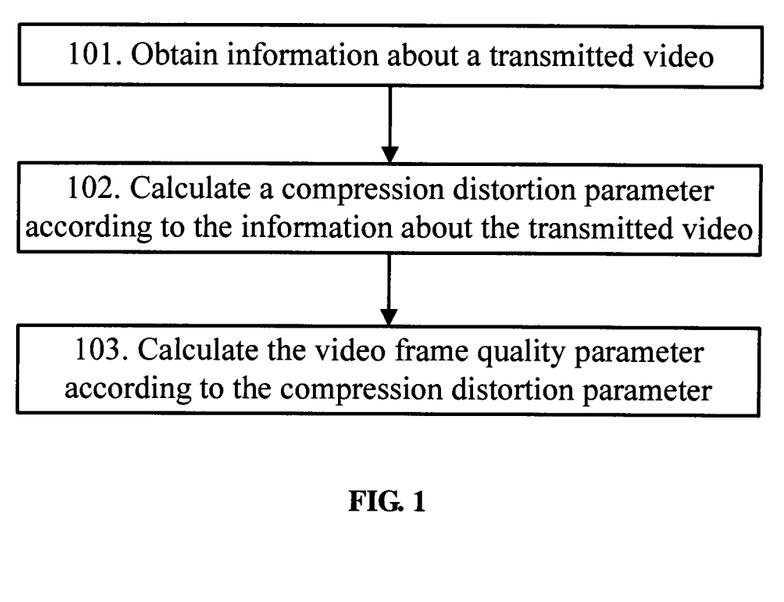
FIG. 1 shows a method for evaluating video quality according to the first embodiment of the present invention.

FIG. 1 shows a method for evaluating video quality in the first embodiment of the present invention. The method includes the following steps:

101. Obtain Information about a Transmitted Video.

In this embodiment, the process of detecting the video quality is performed on the terminal. That is, the apparatus for evaluating video quality may be a part of the terminal or exist independently. The apparatus can evaluate the video quality by obtaining only the information about the video transmitted on the terminal side, without the need of obtaining the original reference video. However, the application scope of this solution is not limited to the terminal side, and this solution is applicable to any network node that can obtain video information.

In this embodiment, the information about the transmitted video includes code rate and quantization factors of video codes (quantization factors mentioned herein refer to the well-known Quantization Parameter (QP), or parameters such as quantization step (Qstep) which controls different quantization extents, but QP is taken as an example below), or further includes duration of a video frame. It is understandable that in practical application, the information about the transmitted video may include other similar types of information.

102. Calculate the Compression Distortion Parameter According to the Information about the Transmitted Video.

In this embodiment, after the information about the transmitted video is obtained, the compression distortion parameter can be calculated. The calculation process is as follows:

The formula of video compression ratio distortion is:

$$R(D) = \begin{cases} \ln\frac{1}{\alpha D} & 0 < D < \frac{1}{\alpha} \\ 0 & D \geq \frac{1}{\alpha} \end{cases} \quad (1)$$

In the formula above, $\alpha$ is a Laplace distribution parameter. Using a square distortion measure, $D=Q/4$. Therefore, $$R = \ln\frac{4}{\alpha \cdot QP}.$$

Especially, for a video sequence, $\alpha=k/\sigma$, where $\sigma$ is regional variance of the video.

In the formula above, R represents code rate, and QP represents quantization factor. R and QP can be calculated out according to the information about the transmitted video. The calculation method is covered in the prior art and is not limited herein.

From the formula above, it is deduced that:

$$\sigma = c_1 \cdot QP \cdot e^{c_2 R} \quad (2)$$

For a fixed QP, $\sigma = c_1 \cdot e^{c_2 R}$. Generally, the value range of R is narrow (R<0.3). For a smaller R value, $\sigma$ is in approximately linear relation to R. That is, formula (2) above can be used to calculate out the space domain complexity parameter and the time domain activity parameter of the video frame:

Space domain complexity parameter $\sigma_s = c_1 + c_2 R$; and time domain activity parameter $\sigma_T = c_3 + c_4 R$.

In the formulas above, $c_1, c_2, c_3, c_4$ are constants and can be determined experimentally. Each QP corresponds to fixed $c_1, c_2, c_3, c_4$. That is, the space complexity parameter and the time domain activity parameter are calculated according to QP and R.

The space domain complexity parameter and the time domain activity parameter are calculated out through formula (2) above for different video frames. For a video frame encoded in an intra-frame mode, $\sigma$ reflects the space domain complexity of the video frame; for a video frame encoded in an inter-frame mode, $\sigma$ reflects the time domain activity of the video frame.

The space domain complexity represents the complexity of the video space content, for example, the element included in a frame. Generally, more elements lead to more space domain complexity of the video.

The time domain activity represents motion characteristics of the time domain of the video. For example, the duration of a frame, and extent of alternating one video frame with another. Generally, higher extent of alternating leads to higher time domain activity of the video.

As general items, $\sigma_{S,n}$ refers to the space domain complexity of video frame n, $\sigma_{T,n}$ refers to the time domain activity of video frame n, $R_n$ refers to the code rate of video frame n, and $QP_n$ refers to an average quantization factor of video frame n.

For a video frame encoded in an intra-frame mode, its time domain activity is predicted according to the time domain activity of an adjacent video frame encoded in an inter-frame mode; for a video frame encoded in an inter-frame mode, its space domain complexity is predicted according to the space domain complexity of an adjacent video frame encoded in an intra-frame mode.

103. Calculate the Video Frame Quality Parameter According to the Compression Distortion Parameter.

In step 102 above, the code rate of the video frame, the quantization factor, the space domain complexity parameter, and the time domain activity parameter are calculated. Therefore, the video frame quality parameter can be calculated according to such parameters.

As a prerequisite knowledge for calculating the video frame quality parameter according to the compression distortion parameter, the relation between video compression and video quality is described below.

Video compression is a category of lossy compression. The quantization process of video coding is a fundamental cause for video compression distortion. Generally, a network video application can receive and decode most frames correctly. Therefore, for a video frame without error, the linchpin of evaluating the video quality is to measure the quantization distortion according to the visual characteristics of the user.

Figure 2:
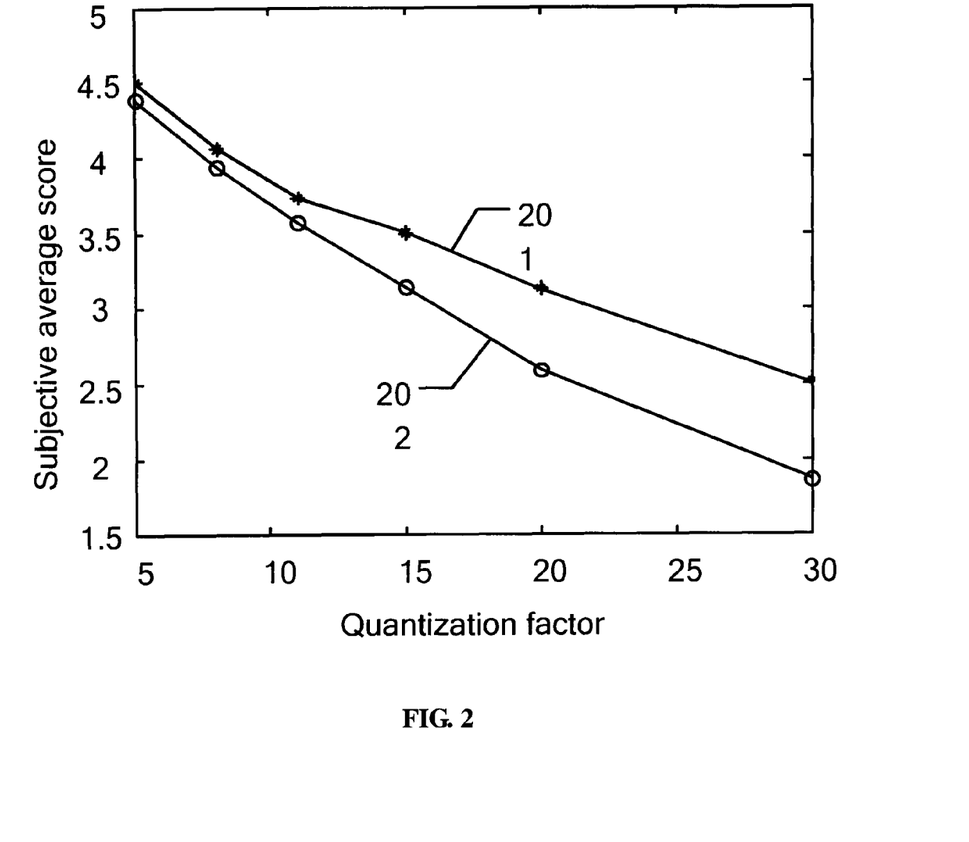
FIG. 2 is a diagram of linear relation between subjective quality evaluation and compression distortion according to an embodiment of the present invention.

Subjective experiments prove that the subjective quality of the video frame is in approximately linear relation to the QP or the quantization step, as shown in FIG. 2. In FIG. 2, curve 201 and video 202 represent two different video sequences. FIG. 2 demonstrates the curve relation between the video quality and the QP for different video sequences when only the compression distortion is taken into account. As revealed in FIG. 2, the linear relation between the subjective quality and the QP of different video sequences takes on different characteristics (for example, different intercepts and slopes), thus reflecting the content characteristics of the video, namely, space domain complexity and time domain activity of the video. Therefore, when only compression distortion is taken into account, the quality parameter of a video frame depends on the space domain complexity parameter, the time domain activity parameter, the code rate, and the quantization factor of the video frame.

Specifically, the compression distortion caused by the video coder is specifically caused by Discrete Cosine Transform (DCT) coefficient quantization. Therefore, the quantization factor is directly related to compression distortion of the video. Subjective experiments prove that the subjective quality of the video frame is in approximately linear relation to the QP, namely $$Q_n^{F'} = a*QP + b \quad (3)$$

In the formula above, $Q_n^{F'}$ represents the subjective quality of the video frame n, also known as video frame quality radix;

a and b are constants, which can be obtained through subjective experiments. The process of obtaining a and b are not limited herein.

The quality of each frame depends on the space complexity of the video and the time complexity. Therefore, from formula (3), it is deduced that:

$$Q_n^F = Q_n^{F'} * \left(1 + \left(\frac{\sigma_S}{a_1}\right)^{b_1}\right) * \left(1 + \left(\frac{\sigma_T}{a_2}\right)^{b_2}\right) \quad (4)$$

Likewise, in formula (4) above, $a_1, a_2, b_1$ and $b_2$ are constants, and are obtained through subjective experiments. The process of obtaining $a_1, a_2, b_1$ and $b_2$ is not limited herein.

The space domain complexity parameter and the time domain activity parameter calculated above are substituted into formula (4) so that formula (4) includes only the code rate and the quantization factor:

$$Q_n^F = Q_n^{F'} * \left(1 + \left(\frac{c_1 + c_2 R}{a_1}\right)^{b_1}\right) * \left(1 + \left(\frac{c_3 + c_4 R}{a_2}\right)^{b_2}\right) \quad (5)$$

Based on formula (5), the quality parameter of the video frame is obtained. Because $c_1, c_2, c_3, c_4$ depend on Qp, formula (5) reflects the relation between the video quality, code rate R and the QP. The quality parameter is the video frame quality parameter obtained when only the compression distortion is taken into account.

In this embodiment, after the quality parameter of the video frame is obtained, the quality parameter of the video sequence can be calculated according to the quality parameter of the video frame. However, the rate control algorithm of the video coder tends to make the video frame rate change with time on the decoder side.

Besides, short pause usually occurs in the process of playing the video due to change of the network bandwidth. Therefore, the quality of the whole video sequence is not the sum or average quality of all frames. The evaluation of the quality of the video sequence needs to be based on more factors such as video play frame rate and play pause.

In this embodiment, therefore, the calculation of the quality parameter of the video sequence is based on the "contribution of the video frame to the video sequence score". The "contribution of the video frame to the video sequence score" refers to the effect of individual video frames on the whole video quality when the whole video sequence is displayed, and depends on the quality of the video frame and the duration of the video frame. In this embodiment and all subsequent embodiments, the duration refers to the interval between the video frames. The interval time may be the display time interval between two continuous frames that include different display contents. For example, after frame a is displayed, frame a is buffered, and frame b is displayed after completion of the buffering. In this case, the duration between frame a and frame b includes the buffering time. The duration may involve this scenario: Several frames after frame a are lost and not decodable, and its true content cannot be displayed; but frame b can be decoded and displayed correctly. In this case, after completion of displaying frame a, different processing and display policies may be applied according to different error concealment methods. A general practice is to display the content of frame a as the content of each lost frame after frame a, and then display frame b. In this case, the time interval refers to the difference between the display time of the first frame a and the display time of frame b.

More specifically, the contribution ($Q_n^{FoS}$) of video frame n to the video sequence score depends on the quality parameter of video frame n, the time domain activity parameter of the video frame, and the duration of the video frame.

After the contribution of each video frame to the video sequence score is obtained, the quality parameter of the whole video sequence can be obtained through time domain weighting.

In this embodiment, after the information about the transmitted video is obtained, at least a compression distortion parameter can be calculated according to the information about the transmitted video. Afterward, the video frame quality parameter is calculated according to at least the compression distortion parameter. Therefore, the quality of the video frame can be calculated out according to only the information about the transmitted video on the terminal side, without the need of obtaining the original reference video; and the network resources are saved.

Secondly, in this embodiment, the video frame quality parameter depends on at least the compression distortion parameter, namely, the compression distortion parameter is an index for evaluating the video frame quality; and the video frame quality is in linear relation to the compression distortion parameter. Therefore, the compression distortion parameter for evaluating the video frame quality can reflect the user's perception about the network video more intuitively, and improve the accuracy of evaluating the video quality.

Scenario 2: The Compression Distortion Parameter and the Video Quality Distortion Parameter with Packet Loss are Used as Video Frame Parameters.

In this embodiment, if the quality of the transmission channel of the video is not high, the video quality distortion may be with packet loss. That is, the video frame loss needs to be taken into account at the time of calculating the video frame quality parameter. However, in the prior art, network videos need to be coded and compressed due to limited bandwidth. In this embodiment, therefore, the compression distortion parameter and the video quality distortion parameter with packet loss are used as a basis for evaluating the video quality.

Figure 3:
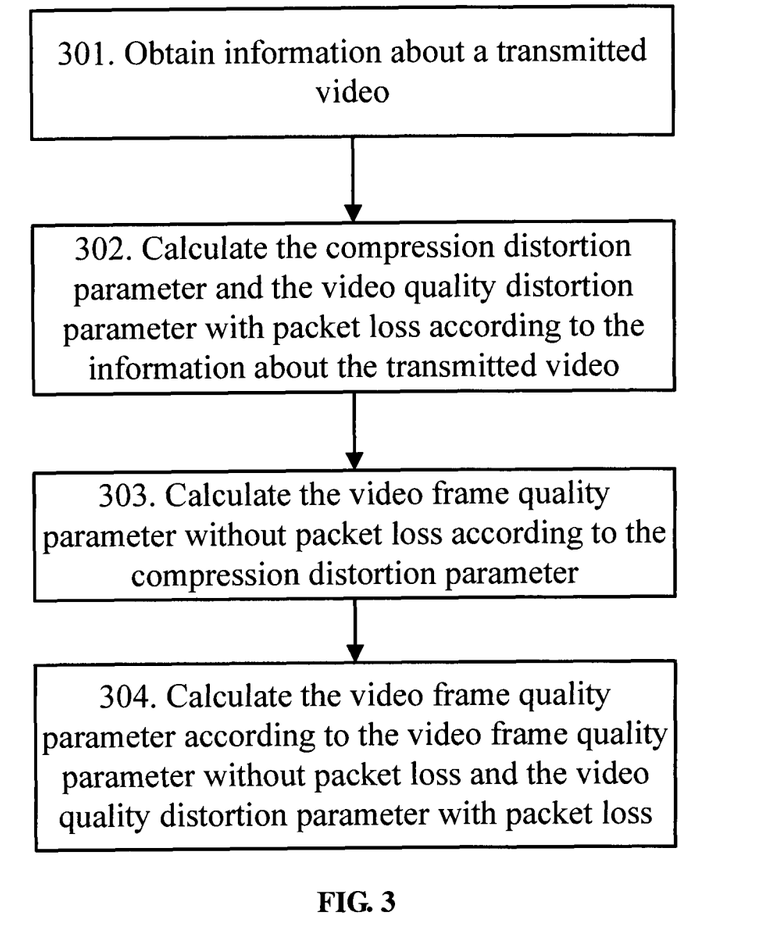
FIG. 3 shows a method for evaluating video quality according to the second embodiment of the present invention.

FIG. 3 shows a method for evaluating video quality in the second embodiment of the present invention. The method includes the following steps:

301. Obtain Information about a Transmitted Video.

In this embodiment, it is assumed that the process of detecting the video quality is performed on the terminal. That is, the apparatus for evaluating video quality may be a part of the terminal or exist independently. The apparatus can evaluate the video quality by obtaining only the information about the video transmitted on the terminal side, without the need of obtaining the original reference video. However, the application scope of this solution is not limited to the terminal side, and this solution is applicable to any network node that can obtain video information.

In this embodiment, the information about the transmitted video may include code rate, quantization factor of video codes, or duration of a video frame. It is understandable that in practical application, the information about the transmitted video may include other similar types of information.

302. Calculate the Compression Distortion Parameter and the Video Quality Distortion Parameter with Packet Loss According to the Information about the Transmitted Video.

In this embodiment, the process of calculating the compression distortion parameter according to the information about the transmitted video is the same as that in the first embodiment above.

Besides, in this embodiment, the video quality distortion parameter with packet loss can be calculated. For network videos, the video quality distortion with packet loss is critical to the video quality. The loss of video data makes the decoder unable to recover the relevant video frame area normally, and leads to distortion of the recovered video. For the video encoded in the inter-frame prediction mode, the error or loss of the reference video frame leads to propagation of errors. Besides, for real-time video streams, the affect of the delay and jitter of the network packet on the video terminal results in data loss.

In this embodiment, the video quality distortion parameter is $d_n$, which represents the impact caused by data loss onto the video frame quality. It should be noted that "fragment" is a minimum unit of decoding on the decoder. If a fragment is lost, the decoder will conceal the error. The quality of the video with concealed errors is closely related to the content of the video. Therefore, the space domain and time domain dependence of videos means that the space domain complexity and the time domain activity of the video frame are critical to the effect of error concealment. Besides, when no data is lost, the quality of the video frame is critical to $d_n$.

In this embodiment, therefore, $d_n$ includes two parameters: one is $d_{e,n}$, which indicates the extent of deterioration of quality of the video frame as a result of data loss; and the other is $d_{p,n}$, which indicates the extent of deterioration of quality of the video frame as a result of error propagation.

First, the calculation process of $d_{e,n}$ is described below:

If more video data is lost, the distortion caused by the error is more serious. Therefore, the quality parameter of a video frame that includes errors is:

$$Q_n^F = Q_n^R - \frac{num_A - num_R}{num_A} D_n \quad (6)$$

In formula (6) above, $num_R$ represents the number of valid packets received for the frame (the packets may be Real-time Transport Protocol (RTP) packets or other video transport protocol packets, and the RTP packets are taken as an example here), $num_A$ represents the total number of RTP packets of the frame, and $Q_n^R$ is a quality parameter of a video frame free of errors. When the current frame is lost, because the parameters for calculation are unavailable, $Q_n^R$ can be obtained through prediction according to an error concealment method on the decoder side. For example, if the previous frame is used to perform time domain concealment, the current frame can be predicted through the parameters of the previous frame. In formula (6), $D_n$ represents distortion caused by loss of the whole video frame.

$$D_n = Q_n^R \cdot \left(\frac{\sigma_T}{a_3}\right)^{b_3} \quad (7)$$

From formula (6) and formula (7) above, it is deduced that:

$$d_{e,n} = \left(\frac{num_A - num_R}{num_A}\right) \cdot Q_n^R \cdot \left(\frac{\sigma_T}{a_3}\right)^{b_3} \quad (8)$$

In formula (8) above, $a_3$ and $b_3$ are constants, and are obtained through experiments. The method of obtaining $a_3$ and $b_3$ is not limited herein.

Secondly, the method of calculating $d_{p,n}$ is described below:

For the video encoded in the inter-frame prediction mode, either the error in the reference video or the loss of the video frame leads to propagation of errors. If the time activity of the video is higher, the video quality is affected by errors more seriously. When video frame n incurs error propagation, the quality parameter of the video frame is:

$$Q_n^F = Q_n^R - D_n \quad (9)$$

$Q_n^R$ is a quality parameter of a video frame free of errors, and $D_n$ is distortion of the video frame as a result of error propagation, namely, $d_{p,n}$.

$$D_n = D_{n-1} \cdot \left(1 + \left(\frac{\sigma_T}{a_4}\right)^{b_4}\right) \quad (10)$$

In the formula above, $D_{n-1}$ is distortion of the previous frame as a result of errors. When video frame n is lost, because the frame is encoded in an inter-frame prediction mode, $Q_n^R$ may be roughly replaced with $Q_{n-1}^R$ of the previous frame.

In the formula above, $a_4$ and $b_4$ are constants, and can be obtained through experiments.

After $d_{e,n}$ and $d_{p,n}$ are calculated out according to the method described above, the two parameters can be added to obtain $d_n$, namely, a video quality distortion parameter with packet loss.

303. Calculate the Video Frame Quality Parameter without Packet Loss According to the Compression Distortion Parameter.

The step of calculating the video quality parameter without packet loss in this embodiment is the same as step 203 in the first embodiment, and is not repeated here any further.

304. Calculate the Video Frame Quality Parameter According to the Video Frame Quality Parameter without Packet Loss and the Video Quality Distortion Parameter with Packet Loss.

After the video quality distortion parameter with packet loss is obtained in step 302 and the video frame quality parameter without packet loss is obtained in step 303, the difference between the video frame quality parameter without packet loss and the video quality distortion parameter with packet loss may be used as a video frame quality parameter.

In this embodiment, after the quality parameter of the video frame is obtained, the quality parameter of the video sequence can be calculated according to the quality parameter of the video frame. However, the rate control algorithm of the video coder tends to make the video frame rate change with time on the decoder side.

Besides, short pause usually occurs in the process of playing the video due to change of the network bandwidth. Therefore, the quality of the whole video sequence is not the sum or average quality of all frames. The evaluation of the quality of the video sequence needs to be based on more factors such as video play frame rate and play pause.

In this embodiment, therefore, the calculation of the quality parameter of the video sequence is based on the "contribution of the video frame to the video sequence score". The "contribution of the video frame to the video sequence score" refers to the weight of each video frame in the whole video quality, and depends on the quality of the video frame and the duration of the video frame.

More specifically, the contribution ($Q_n^{FoS}$) of video frame n to the video sequence score depends on the quality parameter of video frame n, the time domain activity parameter of the video frame, and the duration of the video frame.

After the contribution of each video frame to the video sequence score is obtained, the quality parameter of the whole video sequence can be obtained through time domain weighting.

In this embodiment, after the information about the transmitted video is obtained, at least a compression distortion parameter can be calculated according to the information about the transmitted video. Afterward, the video frame quality parameter is calculated according to at least the compression distortion parameter. Therefore, the quality of the video frame can be calculated out according to only the information about the transmitted video on the terminal side, without the need of obtaining the original reference video; and the network resources are saved.

Secondly, in this embodiment, the video frame quality parameter depends on at least the compression distortion parameter, namely, the compression distortion parameter is an index for evaluating the video frame quality; and the video frame quality is in linear relation to the compression distortion parameter. Therefore, the compression distortion parameter for evaluating the video frame quality can reflect the user's perception about the network video more intuitively, and improve the accuracy of evaluating the video quality.

Scenario 3: the Video Quality Distortion Parameter with Packet Loss is Used as Video Frame Parameter.

In this embodiment, for special videos involving special requirements, for example, the video play quality needs to be as close to the original video quality as possible, the video is not compressed or is compressed at a very small percentage. Meanwhile, some applications take only network impairment into account, but take no video compression impairment into account. In this case, the first scenario taken into account is that the video frame parameters include the video quality distortion parameter with packet loss, and the second possible scenario taken into account is that the video frame parameters include the compression distortion parameter.

In this embodiment, the method of calculating the video quality distortion parameter with packet loss is similar to that described in the second embodiment above.

After the video quality distortion parameter with packet loss is calculated, the initial quality parameter of the video frame may be calculated in a preset mode, namely, by ignoring the impact caused by loss of video packets (the detailed calculation method may be the calculation method available in the prior art, or other similar method of calculating the video frame quality, or a presumed value is applied). The difference between the initial quality parameter of the video frame and the video quality distortion parameter with packet loss is used as a video frame quality parameter.

Similarly, after the video frame quality parameter is calculated out, the video sequence quality may be calculated in the mode described in the preceding embodiment.

In the three embodiments described above, after the video frame quality parameter is calculated out, weighting operation may be performed according to the video frame quality parameter and the duration of the video frame to know the quality of the video sequence. It is understandable that in practice, for an obtained video frame quality parameter, regardless of the mode of calculating the parameter (the mode provided in an embodiment of the present invention, or other modes covered in the prior art), the quality of the whole video sequence can be calculated in the mode disclosed herein. The specific mode is similar to the mode described in the preceding embodiment, and is not limited here.

Figure 4:
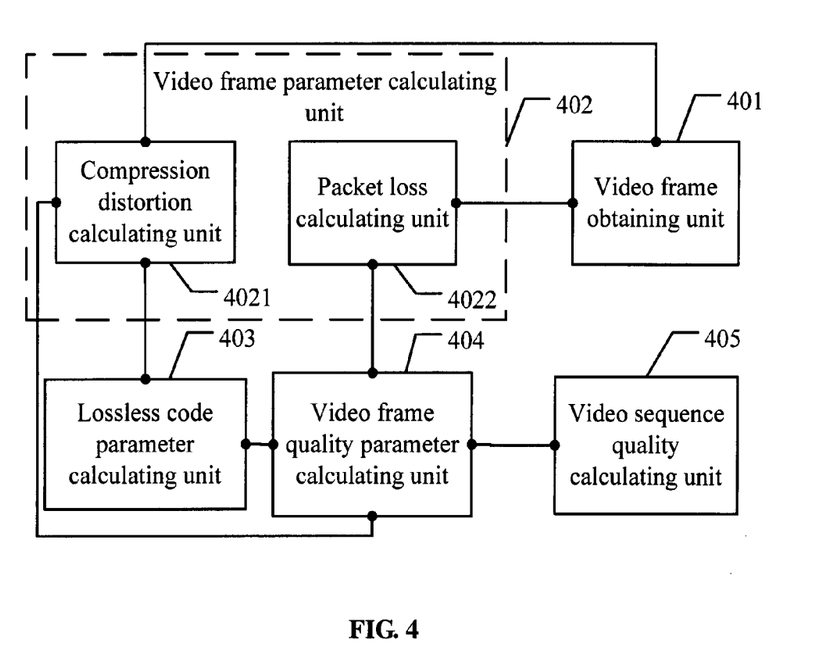
FIG. 4 shows an apparatus for evaluating video quality according to an embodiment of the present invention.

The following describes an apparatus for evaluating video quality in an embodiment of the present invention. As shown in FIG. 4, the apparatus includes:

a video frame obtaining unit 401, configured to obtain information about a transmitted video;

a video frame parameter calculating unit 402, configured to resolve the video information obtained by the video frame obtaining unit 401 to obtain video frame parameters, where the video frame parameters include at least a compression distortion parameter or a video quality distortion parameter with packet loss; and a video frame quality parameter calculating unit 404, configured to calculate a video frame quality parameter according to the video frame parameters calculated out by the video frame parameter calculating unit 402.

Depending on the content of the video frame parameters, this embodiment comes in three scenarios.

Scenario 1: the Video Frame Parameter is a Compression Distortion Parameter Only.

In this scenario, the apparatus for evaluating video quality in this embodiment includes:

a video frame obtaining unit 401, configured to obtain information about a transmitted video;

a video frame parameter calculating unit 402, configured to resolve the video information obtained by the video frame obtaining unit 401 to obtain video frame parameters, where the video frame parameters include at least a compression distortion parameter;

a video frame quality parameter calculating unit 404, configured to calculate a video frame quality parameter according to the compression distortion parameter calculated out by a compression distortion calculating unit 4021; and a video sequence quality calculating unit 405, configured to obtain duration of the video frame, and perform a weighting operation for the video frame quality parameter and the duration to obtain a video sequence quality parameter.

The video frame parameter calculating unit 402 in this embodiment includes a compression distortion calculating unit 4021, which is configured to calculate the compression distortion parameter according to the video information obtained by the video frame obtaining unit 401.

The detailed calculation mode is the same as the calculation mode described in the method embodiment above.

Scenario 2: the Video Frame Parameter is a Video Quality Distortion Parameter with Packet Loss Only.

In this scenario, the apparatus for evaluating video quality in this embodiment includes:

a video frame obtaining unit 401, configured to obtain information about a transmitted video;

a video frame parameter calculating unit 402, configured to resolve the video information obtained by the video frame obtaining unit 401 to obtain video frame parameters, where the video frame parameters include at least a video quality distortion parameter with packet loss;

a video frame quality parameter calculating unit 404, configured to calculate a video frame quality parameter according to the video quality distortion parameter with packet loss, where the video quality distortion parameter is calculated out by a packet loss calculating unit 4022; and a video sequence quality calculating unit 405, configured to obtain duration of the video frame, and perform a weighting operation for the video frame quality parameter and the duration to obtain a video sequence quality parameter.

The video frame parameter calculating unit 402 in this embodiment includes a packet loss calculating unit 4022, which is configured to calculate the video quality distortion parameter with packet loss according to the video information obtained by the video frame obtaining unit 401.

The detailed calculation mode is the same as the calculation mode described in the method embodiment above.

Scenario 3: the Video Frame Parameters Include a Compression Distortion Parameter and a Video Quality Distortion Parameter with Packet Loss.

In this scenario, the apparatus for evaluating video quality in this embodiment includes:

a video frame obtaining unit 401, configured to obtain information about a transmitted video;

a video frame parameter calculating unit 402, configured to resolve the video information obtained by the video frame obtaining unit 401 to obtain video frame parameters, where the video frame parameters include a compression distortion parameter and a video quality distortion parameter with packet loss;

The video frame parameter calculating unit 402 in this embodiment includes a compression distortion calculating unit 4021 and packet loss calculating unit 4022.

The compression distortion calculating unit 4021 is configured to calculate the compression distortion parameter according to the video information obtained by the video frame obtaining unit 401.

The packet loss calculating unit 4022 is configured to calculate the video quality distortion parameter with packet loss according to the video information obtained by the video frame obtaining unit 401.

The apparatus for evaluating video quality in this embodiment further includes:

a lossless code parameter calculating unit 403, configured to calculate a video frame parameter without packet loss according to the compression distortion parameter calculated out by the compression distortion calculating unit 4021;

a video frame quality parameter calculating unit 404, configured to calculate a video frame quality parameter according to the video frame parameter without packet loss and the video quality distortion parameter with packet loss, where the video frame parameter without packet loss is calculated out by the lossless code parameter calculating unit 403 and the video quality distortion parameter is calculated out by the packet loss calculating unit 4022; and a video sequence quality calculating unit 405, configured to obtain duration of the video frame, and perform a weighting operation for the video frame quality parameter and the duration to obtain a video sequence quality parameter.

The detailed calculation mode is the same as the calculation mode described in the method embodiment above.

In this embodiment, after the information about the transmitted video is obtained, at least a compression distortion parameter can be calculated according to the information about the transmitted video. Afterward, the video frame quality parameter is calculated according to at least the compression distortion parameter. Therefore, the quality of the video frame can be calculated out according to only the information about the transmitted video on the terminal side, without the need of obtaining the original reference video; and the network resources are saved.

Secondly, in this embodiment, the video frame quality parameter depends on at least the compression distortion parameter, namely, the compression distortion parameter is an index for evaluating the video frame quality; and the video frame quality is in linear relation to the compression distortion parameter. Therefore, the compression distortion parameter for evaluating the video frame quality can reflect the user's perception about the network video more intuitively, and improve the accuracy of evaluating the video quality.

Figure 5:
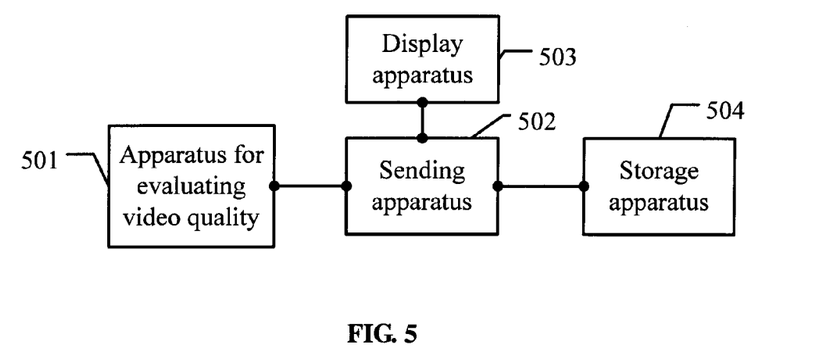
FIG. 5 shows a system for evaluating video quality according to an embodiment of the present invention.

The following describes a system for evaluating video quality in an embodiment of the present invention. As shown in FIG. 5, the system includes:

an apparatus 501 for evaluating video quality, configured to: obtain information about a transmitted video; resolve the information about the transmitted video to obtain video frame parameters, where the video frame parameters include a compression distortion parameter and/or a video quality distortion parameter with packet loss; and calculate a video frame quality parameter according to the video frame parameters; and a sending apparatus 502, configured to obtain and send the video frame quality parameter generated by the apparatus 501 for evaluating video quality.

The system for evaluating video quality in this embodiment may further include:

a display apparatus 503, configured to receive the video frame quality parameter sent by the sending apparatus 502, and display the video frame quality parameter to the user.

The system for evaluating video quality in this embodiment may further include:

a storage apparatus 504, configured to store the video frame quality parameter sent by the sending apparatus 502.

It is understandable that the specific structure of the apparatus 501 for evaluating video quality in this embodiment may be the structure shown in FIG. 4; and the working mode and the data processing procedure of the apparatus 501 are the same as those shown in FIG. 4.

Persons of ordinary skill in the art understand that all or part of the steps of the method specified in any of the embodiments above may be implemented by a program instructing relevant hardware. The program may be stored in a computer readable storage medium. When the program runs, at least the following steps are performed:

obtaining information about a transmitted video;

resolving the information about the transmitted video to obtain video frame parameters, where the video frame parameters include a compression distortion parameter and/or a video quality distortion parameter with packet loss; and calculating a video frame quality parameter according to the video frame parameters.

The storage medium may be Read Only Memory (ROM), magnetic disk, or CD-ROM.

Elaborated above are a method and an apparatus for evaluating video quality under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for evaluating video quality, comprising:
    obtaining information about a transmitted video;
    resolving the information about the transmitted video to obtain video frame parameters, wherein the video frame parameters comprise a compression distortion parameter and a video quality distortion parameter with packet loss, and at least quantization factor and complexity of video content are used in obtaining the compression distortion parameter, and
    calculating the video frame quality parameter according to the compression distortion parameter and the video quality distortion parameter with packet loss, wherein the resolving of the information about the transmitted video to obtain the video quality distortion parameter with packet loss comprises:
calculating a first video quality distortion parameter and a second video quality distortion parameter according to the information about the transmitted video; and
using a sum of the first video quality distortion parameter and the second video quality distortion parameter as the video quality distortion parameter with packet loss, wherein the first video quality distortion parameter represents extent of video frame quality deterioration caused by loss of data in a video frame, and the second video quality distortion parameter represents extent of video frame quality deterioration caused by propagation of errors;
wherein the calculating of the first video quality distortion parameter according to the information about the transmitted video comprises:
obtaining the number of valid packets in the video frame and the number of all packets;
obtaining difference between the number of all packets and the number of valid packets, and dividing the difference by the number of all packets to obtain a percentage of invalid packets in the video frame; and
multiplying the percentage by a distortion parameter existent when the video frame is lost to obtain a product, and using the product as the first video quality distortion parameter.

2. The method according to claim 1, wherein the calculating of the distortion parameter existent when the whole video frame is lost comprises:
calculating video quality when a current video frame is free of errors; and
calculating the distortion parameter existent when the whole video frame is lost according to a time domain activity parameter existent when the current frame is free of errors and according to preset constants.

3. A method for evaluating video quality, comprising:
obtaining information about a transmitted video;
resolving the information about the transmitted video to obtain video frame parameters, wherein the video frame parameters comprise a compression distortion parameter and a video quality distortion parameter with packet loss, and at least quantization factor and complexity of video content are used in obtaining the compression distortion parameter, and
calculating the video frame quality parameter according to the compression distortion parameter and the video quality distortion parameter with packet loss,
wherein the resolving of the information about the transmitted video to obtain the video quality distortion parameter with packet loss comprises:
calculating a first video quality distortion parameter and a second video quality distortion parameter according to the information about the transmitted video; and
using a sum of the first video quality distortion parameter and the second video quality distortion parameter as the video quality distortion parameter with packet loss, wherein the first video quality distortion parameter represents extent of video frame quality deterioration caused by loss of data in a video frame, and the second video quality distortion parameter represents extent of video frame quality deterioration caused by propagation of errors;
wherein the calculating of the second video quality distortion parameter according to the information about the transmitted video comprises:
obtaining a video quality distortion parameter of a reference frame of a current video frame; and
calculating the second video quality distortion parameter according to the video quality distortion parameter of the reference frame, a time domain activity parameter, and preset constants.

4. A computer implementable method for evaluating video quality, comprising:
obtaining information about a transmitted video;
resolving the information about the transmitted video to obtain video frame parameters, wherein the video frame parameters comprise a compression distortion parameter and a video quality distortion parameter with packet loss, and at least quantization factor and complexity of video space content are used in obtaining the compression distortion parameter, and
calculating the video frame quality parameter according to the compression distortion parameter and the video quality distortion parameter with packet loss;
wherein the resolving of the information about the transmitted video to obtain the video quality distortion parameter with packet loss comprises:
calculating a first video quality distortion parameter and a second video quality distortion parameter according to the information about the transmitted video; and
using a sum of the first video quality distortion parameter and the second video quality distortion parameter as the video quality distortion parameter with packet loss, wherein the first video quality distortion parameter represents extent of video frame quality deterioration caused by loss of data in a video frame, and the second video quality distortion parameter represents extent of video frame quality deterioration caused by propagation of errors;
wherein the calculating of the first video quality distortion parameter according to the information about the transmitted video comprises:
obtaining the number of valid packets in the video frame and the number of all packets;
obtaining difference between the number of all packets and the number of valid packets, and dividing the difference by the number of all packets to obtain a percentage of invalid packets in the video frame; and
multiplying the percentage by a distortion parameter existent when the video frame is lost to obtain a product, and using the product as the first video quality distortion parameter.

5. The method according to claim 4, wherein the calculating of the distortion parameter existent when the whole video frame is lost comprises:
calculating video quality when a current video frame is free of errors; and
calculating the distortion parameter existent when the whole video frame is lost according to a time domain activity parameter existent when the current frame is free of errors and according to preset constants.

6. A computer implementable method for evaluating video quality, comprising:
obtaining information about a transmitted video;
resolving the information about the transmitted video to obtain video frame parameters, wherein the video frame parameters comprise a compression distortion parameter and a video quality distortion parameter with packet loss, and at least quantization factor and complexity of video space content are used in obtaining the compression distortion parameter, and calculating the video frame quality parameter according to the compression distortion parameter and the video quality distortion parameter with packet loss;

wherein the resolving of the information about the transmitted video to obtain the video quality distortion parameter with packet loss comprises:

calculating a first video quality distortion parameter and a second video quality distortion parameter according to the information about the transmitted video; and using a sum of the first video quality distortion parameter and the second video quality distortion parameter as the video quality distortion parameter with packet loss, wherein the first video quality distortion parameter represents extent of video frame quality deterioration caused by loss of data in a video frame, and the second video quality distortion parameter represents extent of video frame quality deterioration caused by propagation of errors;

wherein the calculating of the second video quality distortion parameter according to the information about the transmitted video comprises:

obtaining a video quality distortion parameter of a reference frame of a current video frame; and calculating the second video quality distortion parameter according to the video quality distortion parameter of the reference frame, a time domain activity parameter, and preset constants.

7. A non-transitory computer readable medium storing executable instructions for performing a method for evaluating video quality, comprising:

obtaining information about a transmitted video;

resolving the information about the transmitted video to obtain video frame parameters, wherein the video frame parameters comprise a compression distortion parameter and a video quality distortion parameter with packet loss, and at least quantization factor and complexity of video space content are used in obtaining the compression distortion parameter, and calculating the video frame quality parameter according to the compression distortion parameter and the video quality distortion parameter with packet loss;

wherein the resolving of the information about the transmitted video to obtain the video quality distortion parameter with packet loss comprises:

calculating a first video quality distortion parameter and a second video quality distortion parameter according to the information about the transmitted video; and using a sum of the first video quality distortion parameter and the second video quality distortion parameter as the video quality distortion parameter with packet loss, wherein the first video quality distortion parameter represents extent of video frame quality deterioration caused by loss of data in a video frame, and the second video quality distortion parameter represents extent of video frame quality deterioration caused by propagation of errors;

wherein the calculating of the first video quality distortion parameter according to the information about the transmitted video comprises:

obtaining the number of valid packets in the video frame and the number of all packets;

obtaining difference between the number of all packets and the number of valid packets, and dividing the difference by the number of all packets to obtain a percentage of invalid packets in the video frame; and multiplying the percentage by a distortion parameter existent when the video frame is lost to obtain a product, and using the product as the first video quality distortion parameter.

8. The non-transitory computer readable medium according to claim 7, wherein the calculating of the distortion parameter existent when the whole video frame is lost comprises:

calculating video quality when a current video frame is free of errors; and calculating the distortion parameter existent when the whole video frame is lost according to a time domain activity parameter existent when the current frame is free of errors and according to preset constants.

9. A non-transitory computer readable medium storing executable instructions for performing a method for evaluating video quality, comprising:

obtaining information about a transmitted video;

resolving the information about the transmitted video to obtain video frame parameters, wherein the video frame parameters comprise a compression distortion parameter and a video quality distortion parameter with packet loss, and at least quantization factor and complexity of video space content are used in obtaining the compression distortion parameter, and calculating the video frame quality parameter according to the compression distortion parameter and the video quality distortion parameter with packet loss;

wherein the resolving of the information about the transmitted video to obtain the video quality distortion parameter with packet loss comprises:

calculating a first video quality distortion parameter and a second video quality distortion parameter according to the information about the transmitted video; and using a sum of the first video quality distortion parameter and the second video quality distortion parameter as the video quality distortion parameter with packet loss, wherein the first video quality distortion parameter represents extent of video frame quality deterioration caused by loss of data in a video frame, and the second video quality distortion parameter represents extent of video frame quality deterioration caused by propagation of errors;

wherein the calculating of the second video quality distortion parameter according to the information about the transmitted video comprises:

obtaining a video quality distortion parameter of a reference frame of a current video frame; and calculating the second video quality distortion parameter according to the video quality distortion parameter of the reference frame, a time domain activity parameter, and preset constants.

* * * * *